US007082659B1

(12) United States Patent
Penner

(10) Patent No.: US 7,082,659 B1

(45) Date of Patent: Aug. 1, 2006

(54) BRAKE CABLE TOOL

(76) Inventor: Leonard Penner, 8064 Wellington Way, Riverside, CA (US) 92504

( * ) Notice: Subject to any disclaimer, the term of this patent is extended or adjusted under 35 U.S.C. 154(b) by 0 days.

(21) Appl. No.: 10/782,105

(22) Filed: Feb. 19, 2004

(51) Int. Cl.
*B23P 19/00* (2006.01)

(52) U.S. Cl. ........................................................ 29/278

(58) Field of Classification Search .................. 29/270, 29/272, 237, 235, 268, 278, 280; 294/99.1, 294/99.2, 33

See application file for complete search history.

(56) References Cited

U.S. PATENT DOCUMENTS 4,379,500 A 4/1983 Kamino
4,486,937 A 12/1984 Teramo
5,084,954 A * 2/1992 Klinger ....................... 29/237
5,327,797 A 7/1994 Seifrit, Jr.
5,937,498 A * 8/1999 Ploeger et al. ............ 29/426.6
6,581,729 B1 6/2003 Moriwaki

* cited by examiner

*Primary Examiner*—Robert C. Watson

(57) ABSTRACT

A brake cable tool for facilitating removal of a parking brake cable from a vehicle. The brake cable tool includes a head member being designed for being positioned around the parking brake cable whereby the head member engages a clip member to release the clip member from the housing to allow removal of the parking brake cable from the housing. A handle member is coupled to the head member. The handle member is designed for being gripped by a user whereby the handle member is for positioning the head member with respect to the clip member.

9 Claims, 3 Drawing Sheets

BRAKE CABLE TOOL

BACKGROUND OF THE INVENTION

1. Field of the Invention

The present invention relates to parking brake cable adjusting devices and more particularly pertains to a new brake cable tool for facilitating removal of a parking brake cable from a vehicle.

2. Description of the Prior Art

The use of parking brake cable adjusting devices is known in the prior art. U.S. Pat. No. 4,379,500 describes a device for adjusting a parking brake cable. Another type of parking brake cable adjusting device is U.S. Pat. No. 4,486,937 having a tool for engaging a brake cable and removing the brake cable from the vehicle. U.S. Pat. No. 5,327,797 has a structure for engaging a parking brake cable and actuating the parking brake cable to set the brakes of the vehicle. U.S. Pat. No. 6,581,729 has a device for facilitating replacement of the parking brake cable of a vehicle.

While these devices fulfill their respective, particular objectives and requirements, the need remains for a device that has certain improved features for disengaging a clip member from the housing to allow removal of the parking brake cable from the housing of the vehicle.

SUMMARY OF THE INVENTION

The present invention meets the needs presented above by providing a head member that is inserted between the housing and the clips of the clip member to release the clip member from the housing.

Still yet another object of the present invention is to provide a new brake cable tool that allows the user to perform the task with one hand so that the other hand can be used to remove the parking brake cable once the clip member is disengaged from the housing.

To this end, the present invention generally comprises a head member being designed for being positioned around the parking brake cable whereby the head member engages a clip member to release the clip member from the housing to allow removal of the parking brake cable from the housing. A handle member is coupled to the head member. The handle member is designed for being gripped by a user whereby the handle member is for positioning the head member with respect to the clip member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
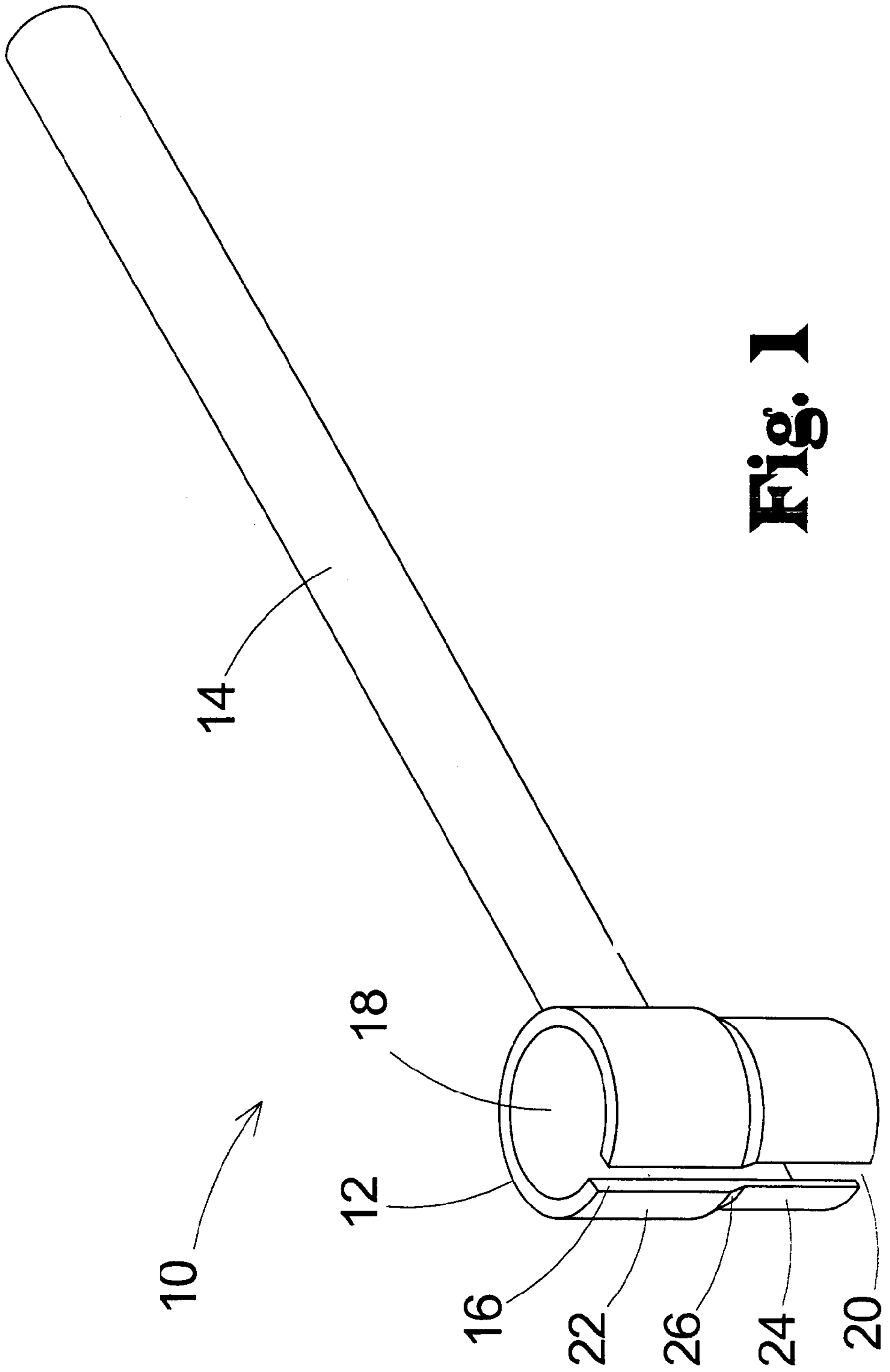
FIG. 1 is a perspective view of a new brake cable tool according to the present invention.
Figure 2:
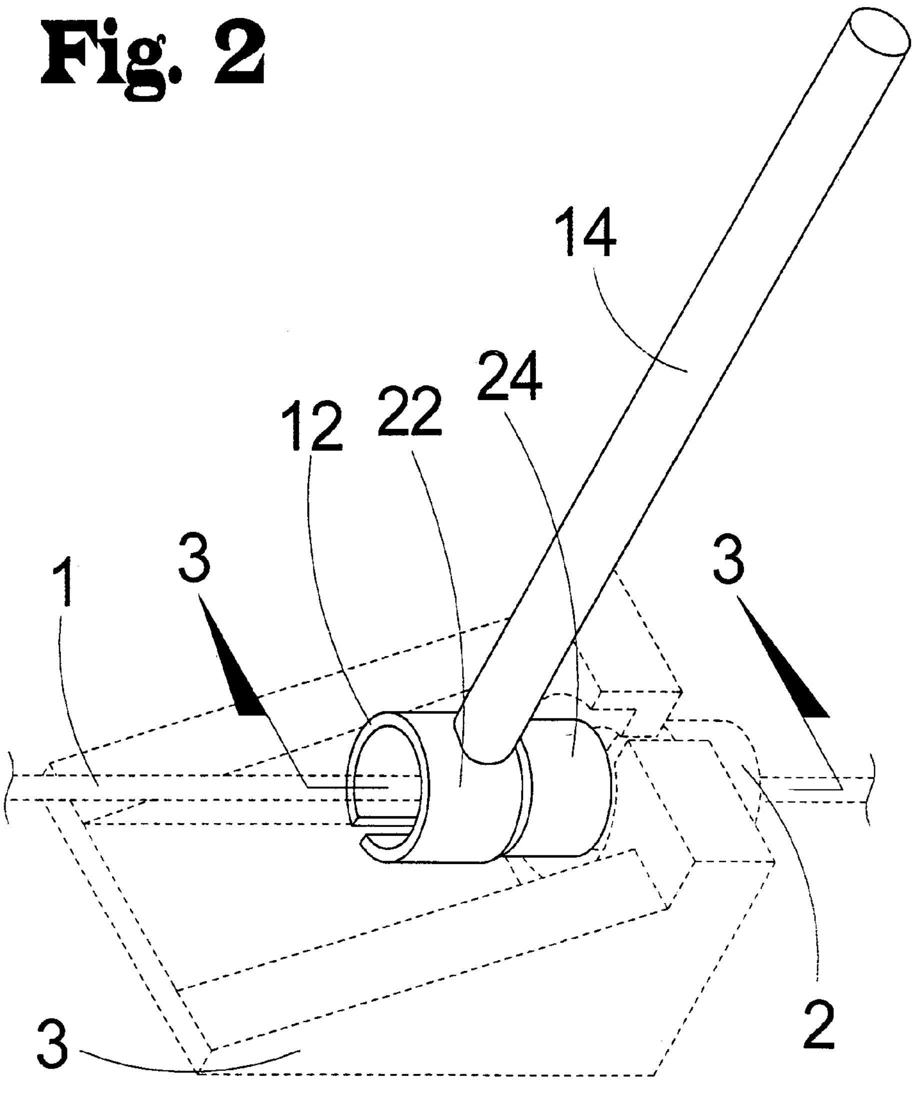
FIG. 2 is a perspective view of the present invention shown in use.
Figure 3:
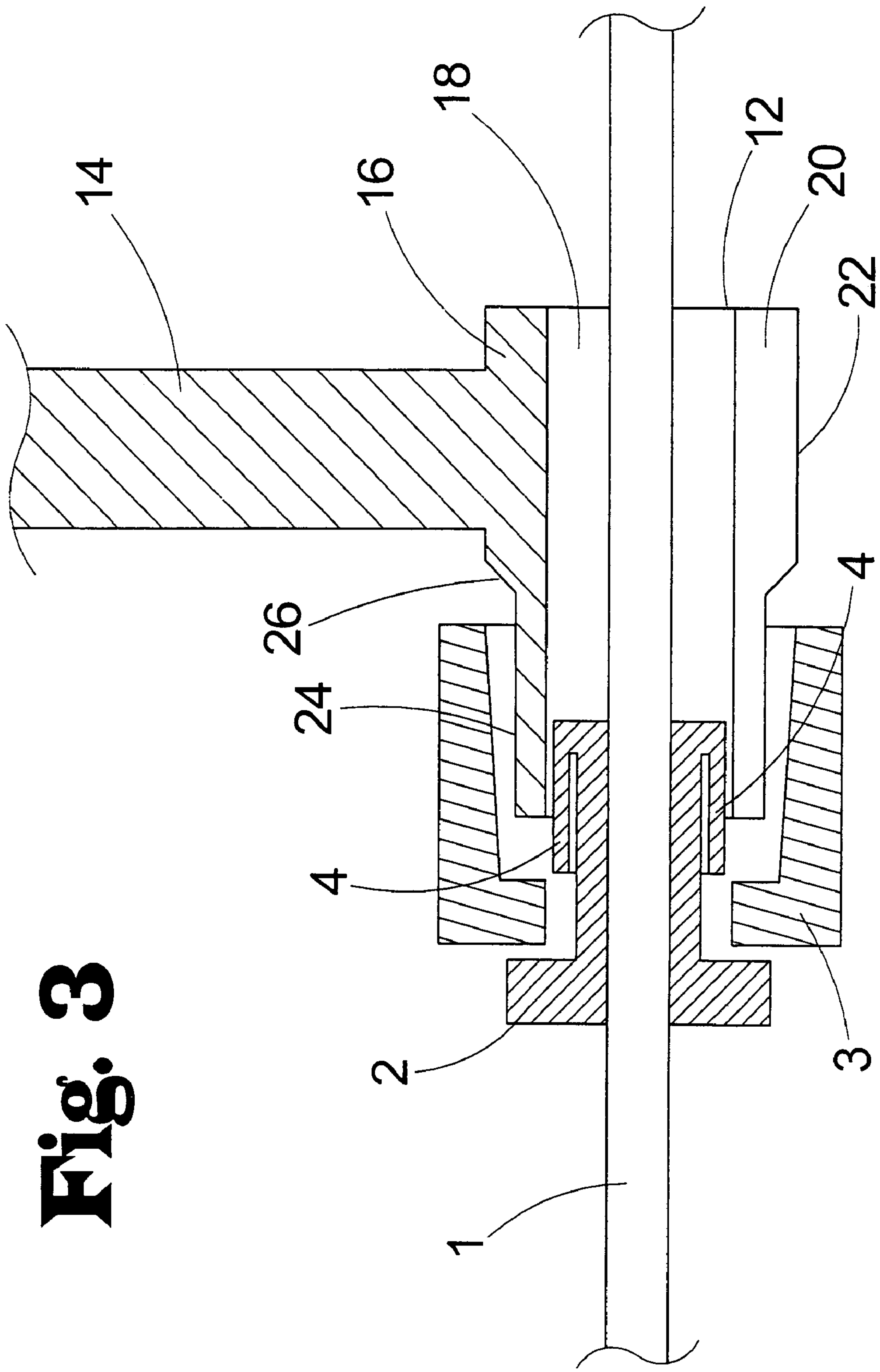
FIG. 3 is a cross-sectional view of the present invention taken along line 3—3 of FIG. 2.

With reference now to the drawings, and in particular to FIGS. 1 through 3 thereof, a new brake cable tool embodying the principles and concepts of the present invention and generally designated by the reference numeral 10 will be described.

As best illustrated in FIGS. 1 through 3, the brake cable tool 10 generally comprises a head member 12 being designed for being positioned around the parking brake cable 1 whereby the head member 12 engages a clip member 2 to release the clip member 2 from the housing 3 to allow removal of the parking brake cable 1 from the housing 3. The head member 12 is about 1 and 11/23 inches in length.

A handle member 14 is coupled to the head member 12. The handle member 14 is designed for being gripped by a user whereby the handle member 14 is for positioning the head member 12 with respect to the clip member 2. The handle member 14 is about 5 and 3/8 inches in length with a diameter of about 3/8 of an inch.

The head member 12 comprises a perimeter wall 16. The perimeter wall 16 defines a bore 18 extending through the head member 12. The bore 18 is designed for receiving the parking brake cable 1 whereby the perimeter wall 16 is positioned around the parking brake cable 1. The perimeter wall 16 of the head member 12 is designed for selectively engaging the clip member 2 whereby the perimeter wall 16 disengages the clip member 2 from the housing 3. The bore 18 of the head member 12 has is about 1/2 inch in diameter.

The perimeter wall 16 comprises a slot 20. The slot 20 extends through the perimeter wall 16 of the head member 12 whereby the slot 20 is in communication with the bore 18 of the head member 12. The slot 20 extends along a length of the head member 12 whereby the slot 20 is designed for permitting the parking brake cable 1 to pass through the perimeter wall 16 into the bore 18 of the head member 12. The slot 20 of the head member 12 is positioned diametrically opposite the handle member 14 to inhibit the handle member 14 contacting the housing 3 when the parking brake cable 1 is being positioned in the head member 12. The slot 20 is about 5/32 of an inch in width.

The head member 12 comprises a first portion 22 and a second portion 24. The first portion 22 is coupled to the second portion 24. The handle member 14 is coupled to the first portion 22. A diameter of the first portion 22 is greater than a diameter of the second portion 24. The second portion 24 is designed for being inserted into the housing 3 to depress clips 4 of the clip member 2 to release the clip member 2 from the housing 3 to allow the parking brake cable 1 to be removed from the housing 3. The first portion 22 of the head member 12 is about 23/32 of an inch in diameter with the second portion 24 being about 21/32 of an inch in diameter.

The head member 12 comprises a tapered portion 26. The tapered portion 26 is coupled between the first portion 22 and the second portion 24. The tapered portion 26 strengthens the junction between the first portion 22 and the second portion 24.

In use, the user slide the parking brake cable 1 through the slot 20 of the head member 12 to position the brake cable in the bore 18 of the head member 12 with the second portion 24 of the head member 12 facing the clip member 2. The handle member 14 is then used to slide the second portion 24 into the housing 3 adjacent the clip member 2 so that the second portion 24 of the head member 12 is positioned between the clips 4 of the clip member 2 and the housing 3 to disengage the clips 4 from the housing 3 to allow the clip member 2 to be removed from the housing 3 so that the parking brake cable 1 can be also removed from the housing 3.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A brake cable tool for facilitating removal of a parking brake cable from a housing of a vehicle, the brake cable tool comprising:

a head member being adapted for being positioned around the parking brake cable such that said head member engages a clip member to release the clip member from the housing to allow removal of the parking brake cable from the housing;

a handle member being coupled to said head member, said handle member being adapted for being gripped by a user such that said handle member is for positioning said head member with respect to the clip member;

said head member comprising a perimeter wall for selectively engaging the clip member, said perimeter wall having a first end and a second end, said perimeter wall defining a substantially cylindrical bore extending through said head member from said first end to said second end for receiving the parking brake cable such that said perimeter wall is positioned around the parking brake cable; and said head member comprising a first portion and a second portion, said first portion being coupled to said second portion, said second portion for being inserted into the housing to depress clips of the clip member to release the clip member from the housing to allow the parking brake cable to be removed from the housing, each of said first portion and said second portion having a substantially cylindrical exterior surface, a diameter of the exterior surface of said first portion being greater than a diameter of the exterior surface of said second portion;

wherein said bore defined by said perimeter wall is uniform in width from the first end of said perimeter wall to the second end of said perimeter wall;

wherein said perimeter wall comprises a slot, said slot extending through said perimeter wall of said head member such that said slot is in communication with said bore of said head member, said slot extending along a length of said head member such that said slot is adapted for permitting the parking brake cable to pass through said perimeter wall into said bore of said head member.

2. The brake cable tool as set forth in claim 1, further comprising:

said slot of said head member being positioned diametrically opposite said handle member to inhibit said handle member contacting the housing when the parking brake cable is being positioned in said head member.

3. The brake cable tool as set forth in claim 1, wherein said handle member being coupled to said first portion.

4. The brake cable tool as set forth in claim 1, further comprising:

said head member comprising a tapered portion, said tapered portion being coupled between said first portion and said second portion, said tapered portion strengthening the junction between said first portion and said second portion.

5. A brake cable tool for facilitating removal of a parking brake cable from a housing of a vehicle, the brake cable tool comprising:

a head member being adapted for being positioned around the parking brake cable such that said head member engages a clip member to release the clip member from the housing to allow removal of the parking brake cable from the housing;

a handle member being coupled to said head member, said handle member being adapted for being gripped by a user such that said handle member is for positioning said head member with respect to the clip member;

said head member comprising a perimeter wall for selectively engaging the clip member, said perimeter wall having a first end and a second end said perimeter wall defining a substantially cylindrical bore extending through said head member from said first end to said second end for receiving the parking brake cable such that said perimeter wall is positioned around the parking brake cable;

said perimeter wall comprising a slot, said slot extending through said perimeter wall of said head member such that said slot is in communication with said bore of said head member, said slot extending along a length of said bead member such that said slot is adapted for permitting the parking brake cable to pass through said perimeter wall into said bore of said head member, said slot of said head member being positioned diametrically opposite said handle member to inhibit said handle member contacting the housing when the parking brake cable is being positioned in said head member;

said head member comprising a first portion and a second portion, said first portion being coupled to said second portion said second portion for being inserted into the housing to depress clips of the clip member to release the clip member from the housing to allow the parking brake cable to be removed from the housing, each of said first portion and said second portion having a substantially cylindrical exterior surface, a diameter of the exterior surface of said first portion being greater than a diameter of the exterior surface of said second portion;

said head member comprising a tapered portion with a substantially frustaconical exterior surface, said tapered portion being coupled between said first portion and said second portion, said tapered portion strengthening the junction between said first portion and said second portion;

wherein said bore defined by said perimeter wall is uniform in width from the first end of said perimeter wall to the second end of said perimeter wall.

6. A brake cable tool for facilitating removal of a parking brake cable from a housing of a vehicle, the brake cable tool comprising:

a head member for positioning around the parking brake cable such that said head member engages a clip member to release the clip member from the housing to allow removal of the parking brake cable from the housing;

a handle member for being gripped by a hand of a user for positioning said head member with respect to the clip member, said handle member being coupled to said head member;

said head member comprising a perimeter wall for selectively engaging the clip member, said perimeter wall having a first end and a second end said perimeter wall defining a substantially cylindrical bore extending through said head member from said first end to said second end for receiving the parking brake cable such that said perimeter wall is positioned around the parking brake cable;

said head member comprising a first portion and a second portion, said first portion being coupled to said second portion, said second portion for being inserted into the housing to depress clips of the clip member to release the clip member from the housing to allow the parking brake cable to be removed from the housing, each of said first portion and said second portion having a substantially cylindrical exterior surface, a diameter of the exterior surface of said first portion being greater than a diameter of the exterior surface of said second portion;

wherein said perimeter wall includes a slot, said slot extending through said perimeter wall of said head member such that said slot is in communication with said bore of said head member, said slot extending along a length of said head member such that said slot is adapted for permitting the parking brake cable to pass through said perimeter wall into said bore of said head member.

7. The brake cable tool as set forth in claim 6, wherein said slot of said head member is positioned diametrically opposite of said handle member to inhibit said handle member contacting the housing when the parking brake cable is being positioned in said head member.

8. The brake cable tool as set forth in claim 6, wherein said head member comprises a tapered portion, said tapered portion being located between said first portion and said second portion.

9. The brake cable tool as set forth in claim 6, wherein said bore defined by said perimeter wall is uniform in width from the first end of said perimeter wall to the second end of said perimeter wall.

* * * * *